(12) United States Patent
Blavius et al.

(10) Patent No.: US 12,170,152 B2
(45) Date of Patent: Dec. 17, 2024

(54) BWR NUCLEAR FUEL ASSEMBLY COMPRISING AN INTERACTION DEVICE BETWEEN A LOWER TIE PLATE AND A FUEL CHANNEL

(71) Applicant: FRAMATOME, Courbevoie (FR)

(72) Inventors: Dirk Blavius, Erlangen (DE); Shawn Heath, Eggolsheim (DE); Szilard Kovacs, Erlangen (DE); Martin Kunz, Weisendorf (DE); Jens Schaefer, Erlangen (DE); Volker Schoß, Weisendorf (DE); James Dennis Tolar, Richland, WA (US)

(73) Assignee: FRAMATOME, Courbevoie (FR)

( * ) Notice: Subject to any disclaimer, the term of this patent is extended or adjusted under 35 U.S.C. 154(b) by 0 days.

(21) Appl. No.: 17/480,630

(22) Filed: Sep. 21, 2021

(65) Prior Publication Data
US 2023/0091913 A1    Mar. 23, 2023

(51) Int. Cl.
*G21C 3/33*    (2006.01)

(52) U.S. Cl.
CPC ........... *G21C 3/3305* (2013.01); *G21C 3/331* (2013.01)

(58) Field of Classification Search
CPC ........ G21C 3/30; G21C 3/331; G21C 3/3305; F16B 21/16; F16B 39/04; F16B 39/10
USPC ........ 376/434, 451, 453, 446; 411/6, 7, 262, 411/294, 1, 103–106, 110–112, 119–120, 411/347; 267/170, 172, 176, 179; 403/7, 403/9, 19, 21, 44, 48, 321, 322.1, 403/323–328
See application file for complete search history.

(56) References Cited

U.S. PATENT DOCUMENTS

| | | | | |
|---|---|---|---|---|
| 3,052,940 A | * | 9/1962 | Sellers | F16B 21/165 411/348 |
| 3,683,988 A | * | 8/1972 | Carter | F16B 39/10 411/105 |
| 3,697,376 A | * | 10/1972 | Mefford | G21C 3/322 376/440 |
| 4,560,532 A | * | 12/1985 | Barry | G21C 3/3305 376/444 |
| 4,663,118 A | * | 5/1987 | Nelson | G21C 3/324 376/445 |
| 4,889,684 A | * | 12/1989 | Johansson | G21C 3/324 376/439 |
| 5,289,514 A | * | 2/1994 | Lippert | G21C 3/32 376/440 |
| 5,339,342 A | * | 8/1994 | Meier | G21C 3/324 376/303 |
| 5,748,695 A | * | 5/1998 | Dunlap | G21C 3/3315 376/444 |
| 6,296,431 B1 | * | 10/2001 | Miller | F16B 5/0208 411/389 |

(Continued)

*Primary Examiner* — Jack W Keith
*Assistant Examiner* — Jinney Kil
(74) *Attorney, Agent, or Firm* — Davidson Kappel LLC

(57) ABSTRACT

A BWR fuel assembly is elongated along a fuel assembly axis and comprises a lower tie plate, an upper tie plate axially spaced from the lower tie plate, a bundle of fuel rods extending axially between the lower tie plate and the upper tie plate, and a tubular fuel channel extending from the lower tie plate to the upper tie plate with encasing the fuel rods. The fuel assembly comprises an interaction device mounted on the lower tie plate and configured to interact with the fuel channel. The interaction device has an inactive configuration and an active configuration.

21 Claims, 12 Drawing Sheets

(56) References Cited

U.S. PATENT DOCUMENTS

2004/0109524 A1\* 6/2004 Reparaz ................. G21C 3/334
 376/434
2010/0025596 A1\* 2/2010 Zeytoonian ............. F16B 31/02
 411/383

\* cited by examiner

BWR NUCLEAR FUEL ASSEMBLY COMPRISING AN INTERACTION DEVICE BETWEEN A LOWER TIE PLATE AND A FUEL CHANNEL

TECHNICAL FIELD

The present disclosure relates to a nuclear fuel assembly for a Boiling Water Reactor (BWR).

BACKGROUND

A reactor core of a nuclear reactor is formed of a plurality of nuclear fuel assemblies, each fuel assembly being elongated along a fuel assembly axis, the fuel assembly axis or each fuel assembly of the reactor core being substantially vertical and the fuel assemblies being positioned side-by-side.

In a BWR, each fuel assembly comprises a lower tie plate, an upper tie plate spaced axially from the lower tie plate, a bundle of elongated fuel rods extending axially between the lower tie plate and the upper tie plate, each fuel rod containing fissile material, a tubular water channel extending axially between the lower tie plate and the upper tie plate within the bundle of fuel rods, a tubular fuel channel extending axially between the lower tie plate and the upper tie plate with encasing the bundle of fuel rods and a transition piece arranged at a lower end of the fuel channel and below the lower tie plate for connecting the water channel to a water outlet of a bottom of the reactor.

In operation, water flows upwardly through the fuel assemblies for retrieving heat from the fuel rods and moderating the nuclear reaction. Water enters each fuel assembly via the transition piece, a fraction of water being channeled by the fuel channel with flowing in contact with the fuel rods, and another fraction of the coolant fluid entering the water channel and flowing through water channel without being in contact with the fuel rods.

The water entering the transition piece enters the fuel channel through the lower tie plate. The lower tie plate has a function of filtering debris that may be present in water and may damage the fuel rods if entering the fuel channel.

It is possible to provide a transition piece that is axially connected the lower end of the fuel channel and that is not axially connected to the lower tie plate. Such an arrangement is named "bundle in basket" as the bundle of fuel rods is retained between the lower tie plate and the upper tie plate with being receive in a basket formed by the fuel channel and the transition piece.

Such an arrangement eases for example the maintenance of the fuel assembly as it allows lifting the sub-assembly formed of the upper tie plate, the lower tie plate and the bundle of fuel rods out of the fuel channel.

However, the water flowing through the lower tie plate tends to lift the lower tie plate upwardly relative to the transition piece, which may be detrimental to the operation or integrity of the fuel assembly.

Besides, the lower tie plate as a function of filtering debris and it is possible to provide a preload part between the periphery of the lower tie plate and the fuel channel.

SUMMARY

One of the aims of the present disclosure is to provide a nuclear fuel assembly for a boiling water reactor that is reliable.

To this end, the present disclosure provides a fuel assembly for a boiling water reactor, the fuel assembly being elongated along a fuel assembly axis and comprising a lower tie plate, an upper tie plate axially spaced from the lower tie plate, a bundle of fuel rods extending axially between the lower tie plate and the upper tie plate, and a tubular fuel channel extending from the lower tie plate to the upper tie plate with encasing the fuel rods, wherein the fuel assembly comprises an interaction device mounted on the lower tie plate and configured to interact with the fuel channel, the interaction device having an inactive configuration and an active configuration.

The activable/deactivable interaction device can be activated for an interaction between the lower tie plate and the fuel channel during operation and deactivated for suppressing this interaction, e.g. during maintenance of the fuel assembly.

The interaction may result in an axial connection between the lower tie plate and the fuel channel, e.g. for avoiding lifting off of the lower tie plate relative to the fuel channel due to water flow and/or a sealing between the periphery of the lower tie plate and the inner surface of the fuel channel, e.g. for avoiding water to by-pass the lower tie plate.

The activation/deactivation may result from temperature, e.g. such that the interaction device is automatically activated in operation inside the reactor core and automatically deactivated during maintenance outside the reactor core, and/or from active operation of a activation/deactivation mechanism by an operator.

In specific embodiments, the fuel assembly may comprises one or several of the following optional features, taken individually or according to any technically feasible combination:

- the interaction device is configured to switch between the inactive configuration and the active configuration as a function of temperature.
- the interaction device comprises a interaction member made in a shape memory alloy, the interaction member being configured to switch between a first shape corresponding to the active configuration and a second shape corresponding to the inactive configuration.
- the interaction device in the active configuration axially connects the lower tie plate to the fuel channel, the fuel channel being axially movable relative to the lower tie plate when the interaction device in the inactive configuration;
- the interaction device in the active configuration axially connects the lower tie plate to the fuel channel through friction fit;
- the interaction device in the active configuration axially connects the lower tie plate to the fuel channel through form-fit;
- the interaction device in the active configuration axially connects the lower tie plate to the fuel channel with engaging with an interaction feature of the fuel channel;
- the interaction device in the active configuration seals a gap between the lower tie plate and the fuel channel to prevent flow of water through said gap;
- the interaction device is operable with a tool to switch between the inactive configuration and the active configuration;
- the interaction device comprises a recess for receiving a tool for operating the interaction device;
- the interaction device comprises an interaction member that is movably mounted on the lower tie plate between an inactive position and an active position;

the interaction device comprises a return member configured for urging the interaction member from the inactive position to the active position;

the interaction device comprises a retaining mechanism configured for retaining the interaction member in the inactive position;

the retaining mechanism comprises an helical slot provided on one of the interaction member and the lower tie plate, and a retaining member provided on the other one of the interaction member and the lower tie plate, the retaining member being engaged into the slot.

BRIEF DESCRIPTION OF THE DRAWINGS

The present disclosure and its advantages will be better understood upon reading the following description that is given solely by way of non-limiting example and with reference to the following drawings.

DETAILED DESCRIPTION

Figure 1:
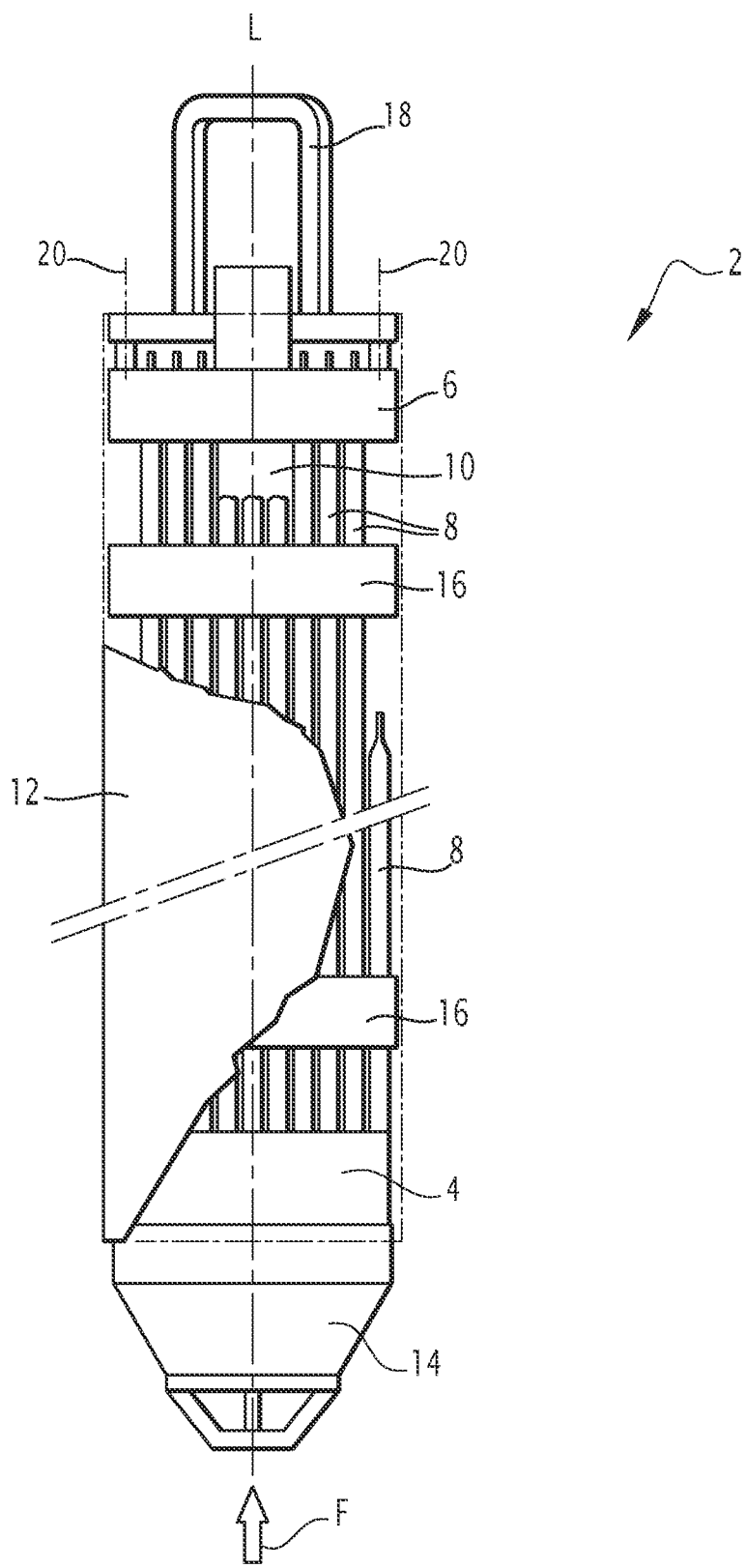
FIG. 1 is a schematic side elevation view illustrating a nuclear fuel assembly for a boiling water reactor according to the present disclosure.

The nuclear fuel assembly 2 illustrated on FIG. 1 is configured for a boiling water reactor (BWR). The fuel assembly 2 is elongated along a fuel assembly axis L.

Such a fuel assembly 2 is intended to be placed with the fuel assembly axis L oriented vertically in a reactor core of a nuclear reactor where water flows upwardly during operation. In the following, the terms "lower" and "upper" refer to the position of the fuel assembly 2 in the reactor core.

The fuel assembly 2 comprises a lower tie plate 4, an upper tie plate 6 spaced axially from the lower tie plate 4, a bundle of nuclear fuel rods 8 extending axially between the lower tie plate 4 and the upper tie plate 6, a tubular water channel 10 extending axially between the lower tie plate 4 and the upper tie plate 6, and axially connecting the lower tie plate 4 to the upper tie plate 6, a tubular fuel channel 12 extending axially between the lower tie plate 4 and the upper tie plate 6 with encasing the bundle of fuel rods 8 and a transition piece 14 located below the lower tie plate 4 with being connected to the lower end of the fuel channel 12. Only a portion of the fuel channel 12 is shown on FIG. 1.

Each fuel rod 8 contains fissile material. Each fuel rod 8 comprises for example a tubular cladding filled with stacked nuclear fuel pellets and closed at its ends by end plugs.

The bundle of fuel rods 8 includes full-length fuel rods and part-length fuel rods. The part-length fuel rods are shorter than the full-length fuel rods.

The fuel assembly 2 also comprises a plurality of spacer grids 16 distributed along the fuel assembly axis, each spacer grid 16 being fixedly attached to the water channel 10 and maintaining the fuel rods 8 axially and transversely.

The fuel rods 8 are maintained transversely by the spacer grids 16 in a spaced relationship. The fuel rods 8 are positioned at the nodes of an imaginary network.

The water channel 10 is located within the bundle of fuel rods 8. The water channel 10 is preferably surrounded by fuel rods 8. The water channel 10 preferably occupies one or several nodes of imaginary network.

The fuel assembly 2 comprises a handle 18 rigidly connected to the upper tie plate 16, the handle 18 being configured for handling the fuel assembly 2, in particular for lifting the fuel assembly 2.

The upper tie plate 6 is rigidly connected to the fuel channel 12 with bolts 20 extending axially, e.g. through brockets (not visible) provided at the upper end of the fuel channel 12. The bolts 20 are schematically illustrated by dash-dotted lines on FIG. 1.

The transition piece 14 is fixedly attached at the lower end of the fuel channel 12, and is located below the lower tie plate 4.

The transition piece 14 is configured for fluidly connecting the fuel channel to a water outlet or nozzle of a bottom of the nuclear reactor.

The transition piece 14 is of tubular shape and has an inlet opening 22 configured to receive water (see arrow F on FIG. 1) and an outlet opening 24 matching the lower end of the fuel channel 12. The transition piece 14 is preferably of funnel shape with tapering downwardly, the inlet opening 22 being of smaller area than the outlet opening 24.

The transition piece 14 is axially fixedly attached to the lower end of the fuel channel 12.

In the embodiment of FIG. 1, the lower tie plate 4 is secured to the transition piece 14, e.g. screwed to the transition piece 14.

In a "bundle-in-basket design", the lower tie plate 4 is configured to be lifted relative to the transition piece 14.

During maintenance operations, this arrangement allows removing the bundle of fuel rods 8 from the fuel channel 12 by detaching the fuel channel 12 from the upper tie plate 6 and lifting the fuel channel 12. The sub-assembly comprising the upper tie plate 6, the water channel 10, the lower tie plate 4, the spacer grids 16 and the fuel rods 8.

However, during normal operation, water enters the transition piece 14 (see arrow F on FIG. 1), flows upwardly through the lower tie plate 4 and then flows upwardly inside the fuel channel 12.

A fraction of water flows inside the fuel channel 12 in contact with the fuel rods 8 and the other fraction of water flows inside the water channel 10 without being in contact with the fuel rods 8.

In a bundle-in-basket design, upon flowing through the lower tie plate 4, the water tends to lift the lower tie plate 14 upwardly relative to the transition piece 14. This may deteriorate the fuel assembly 2.

Figure 2:
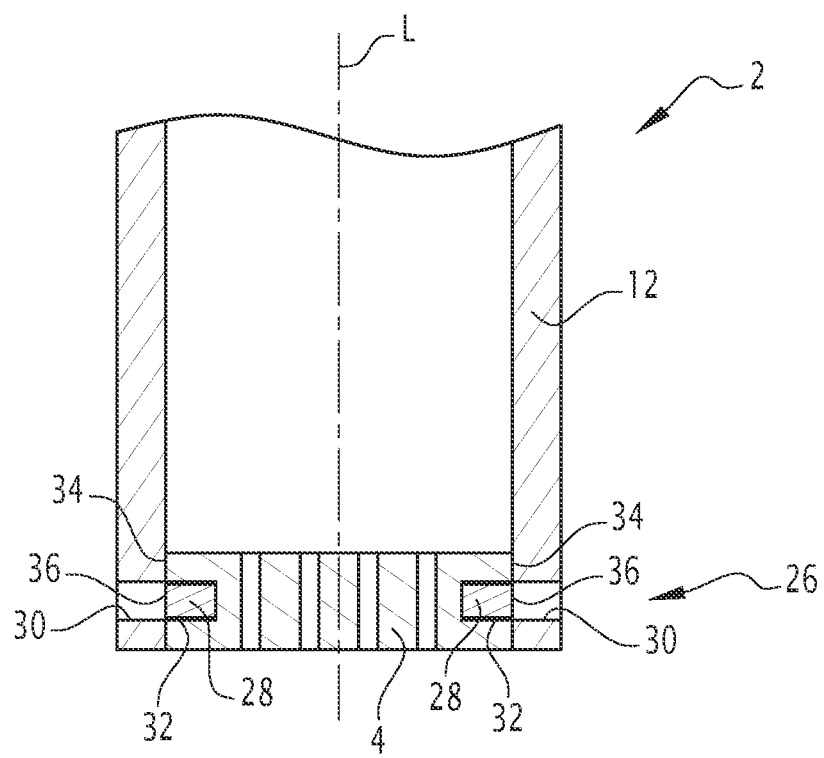
FIGS. 2 and 3 are schematic cross-sectional views illustrating an interaction device arranged between a lower tie plate and a fuel channel, respectively in deactivated configuration and activated configuration.
Figure 3:
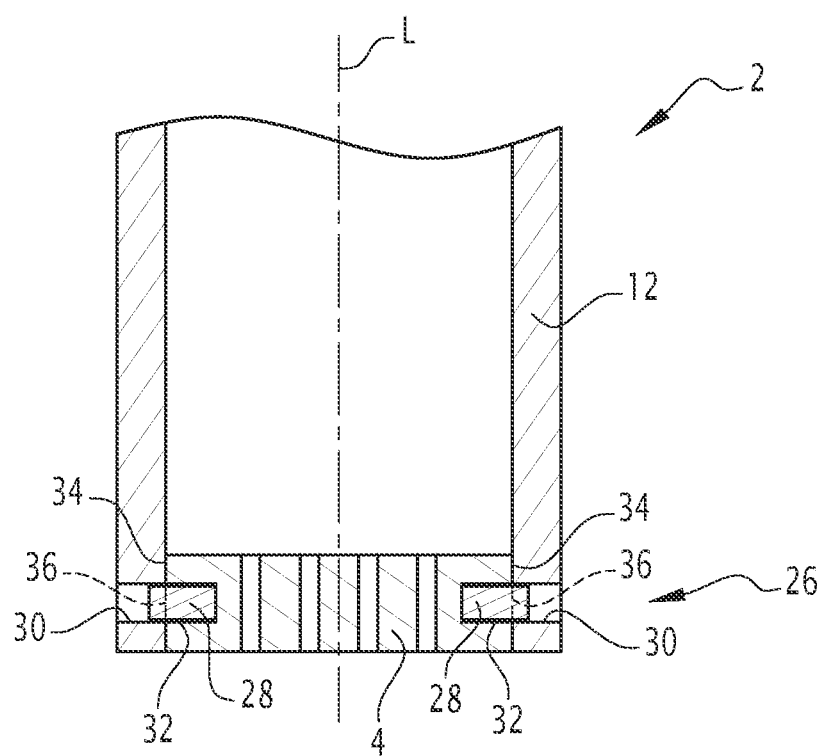

As schematically illustrated on FIGS. 2 and 3, the fuel assembly 2 comprises a configurable interaction device 26 provided onto the lower tie plate 4 and having an inactive configuration (FIG. 2) in which the interaction device 26 does not interacts with the fuel channel 12 and an active configuration (FIG. 3) in which the interaction device 26 interacts with the fuel channel 12.

In the example illustrated on FIGS. 2 and 3, the interaction device 26 is configured for axially connecting the lower tie plate 4 to the fuel channel 12 when the interaction device 26 is active, and for allowing an axial upward movement of the lower tie plate 4 relative to the fuel channel 12 when the interaction device 26 is inactive.

The interaction device 26 is thus an activable/deactivable axial locking device for axially locking/unlocking the lower tie plate 4 relative to the fuel channel 12.

As in the example of FIGS. 2 and 3, the interaction device 26 is advantageously activable/deactivable as a function of temperature.

In particular, the interaction device 26 is configured to activate itself above (resp. below) an activation temperature and to deactivate itself below (resp. above) a deactivation temperature, the activation temperature is identical to the deactivation temperature or being superior (resp. inferior) to the deactivation temperature.

In one example, the interaction device 26 is configured to activate at high temperature and to deactivate at low temperature.

The interaction device 26 is configured for example to activate itself above an activation temperature and to deactivate itself below a deactivation temperature. The activation temperature and the deactivation temperature may be substantially identical (i.e. an activation/deactivation temperature) or, alternatively, the activation temperature may be higher than the deactivation temperature (e.g. is case of a hysteresis phenomenon).

Preferably, the interaction device 26 configured to axially lock/unlock the lower tie plate 4 relative the fuel channel 12 is configured to be active at high temperature and inactive at low temperature.

Hence, the lower tie plate 4 is axially locked to the fuel channel 12 at high temperature inside the reactor core during normal operation of the nuclear reactor and the lower tie plate 4 is axially unlocked from the fuel channel 12 at low temperature during maintenance, e.g. in a cool fuel assembly storage pool.

In a preferred example, the activation temperature and the deactivation temperature are substantially equal and comprised between 80° C. and 120° C., e.g. around 100° C.

As illustrated on FIGS. 2 and 3, the interaction device 26 is configured for axially locking the lower tie plate 4 to the fuel channel 12 via a form-fit.

The interaction device 26 comprises at least one interaction member 28 mounted onto the lower tie plate 4, each interaction member 28 having a first shape in which the interaction member 28 is disengaged from the fuel channel (inactive configuration) and a second shape in which the interaction member 28 engages a locking feature 30 of the fuel channel 12 such that the interaction member 28 axially lock the lower tie plate 4 relative to the fuel channel 12.

As illustrated on FIGS. 2 and 3, the locking feature 30 is for example a hole provided in the inner surface of the fuel channel 12. The locking member in the second shape penetrates into the locking feature 30 provide as a hole.

Alternatively, the locking feature 30 is a protrusion provided on the internal surface of the fuel channel 12. The interaction member 28 in the second shape engages for example below the locking feature 30 provide as a protrusion.

Advantageously, each interaction member 28 is made of a shape memory alloy such that the interaction member 28 exhibits the first shape or the second shape as a function of the temperature of the interaction member 28.

In a preferred example, the interaction member 28 exhibits the first shape at low temperature and exhibits the second shape at high temperature.

In particular, the interaction member 28 exhibits the first shape below a deactivation temperature and exhibits the second shape above the activation temperature. The consideration above in respect of activation temperature and deactivation temperature apply to the shape of the interaction member 28.

Preferably, the interaction device 26 comprises a plurality of locking members 28 distributed at the periphery of the lower tie plate 4. In particular, the lower tie plate 4 exhibits a rectangular or square contour, the interaction device 26 comprising at least one interaction member 28 on each side of the contour.

Figure 4:
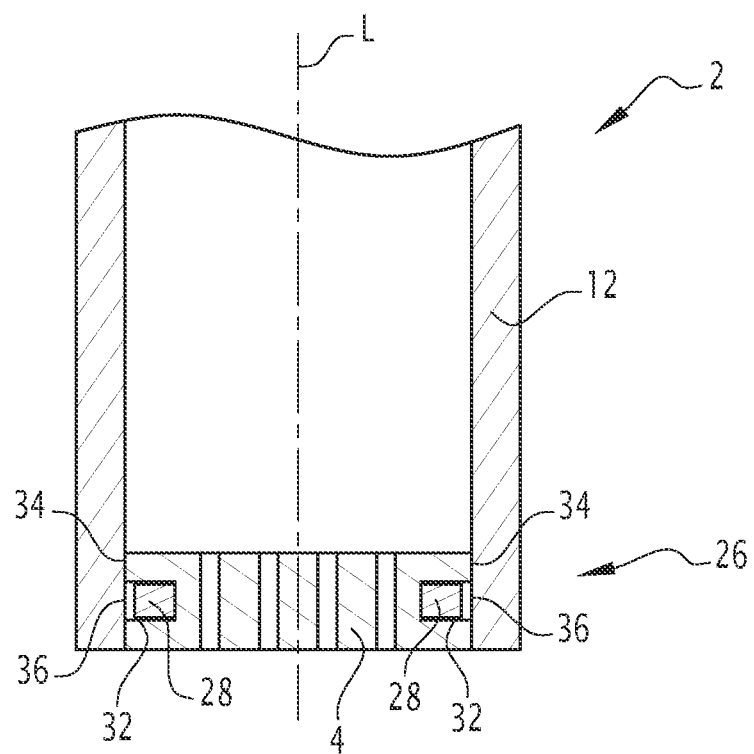
FIGS. 4 and 5 are schematic cross-sectional views illustrating an interaction device arranged between a lower tie plate and a fuel channel, respectively in deactivated configuration and activated configuration.
Figure 5:
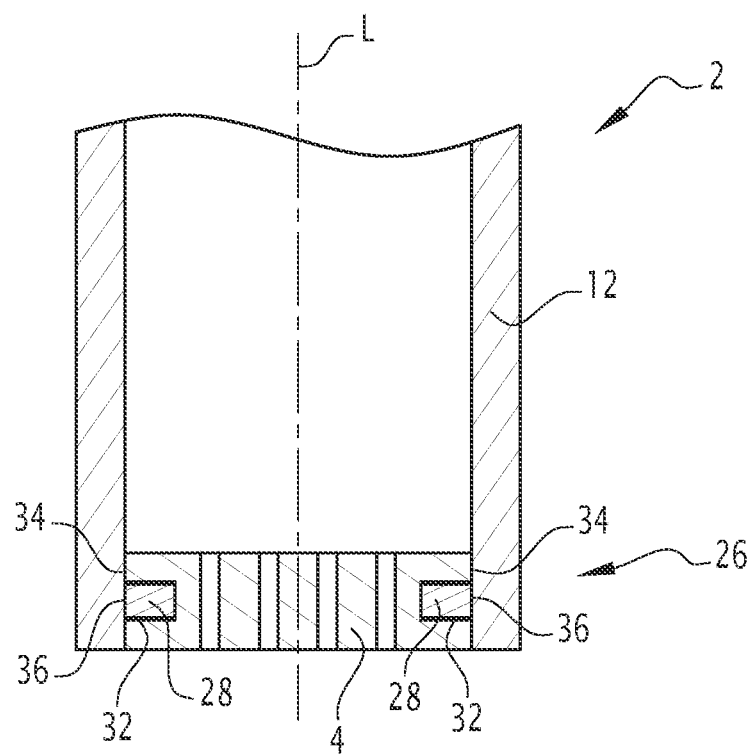

The example illustrated on FIGS. 4 and 5 differs from that illustrate on FIGS. 2 and 3 in that the interaction device 26 is configured for axially locking the lower tie plate 4 to the fuel channel 12 via friction.

The interaction device 26 comprises at least one interaction member 28 mounted onto the lower tie plate 4, each interaction member 28 having a first shape in which the interaction member 28 is disengaged from the fuel channel 12 (inactive configuration) and a second shape in which the interaction member 28 is in contact with the inner surface of the fuel channel 12 such as to axially lock the lower tie plate 4 relative to the fuel channel 12.

As in the example of FIGS. 2 and 3, each interaction member 28 of FIGS. 4 and 5 is preferably made of a shape memory alloy, preferably to exhibit the first shape below a deactivation temperature and exhibits the second shape above the activation temperature.

As illustrated on FIG. 2-5, each interaction member 28 is for example mounted inside a cavity 32 provided on a side face 34 of the lower tie plate 12, the cavity emerging on the side face 34 via an opening 36. The interaction member 28 in the second shape (active configuration) protruding outside the cavity 32 through the opening for engaging the fuel channel 12, in particular for engaging the locking feature 30 (FIG. 3) or for engaging the inner surface of the fuel channel 12 by friction (FIG. 5).

Figure 6:
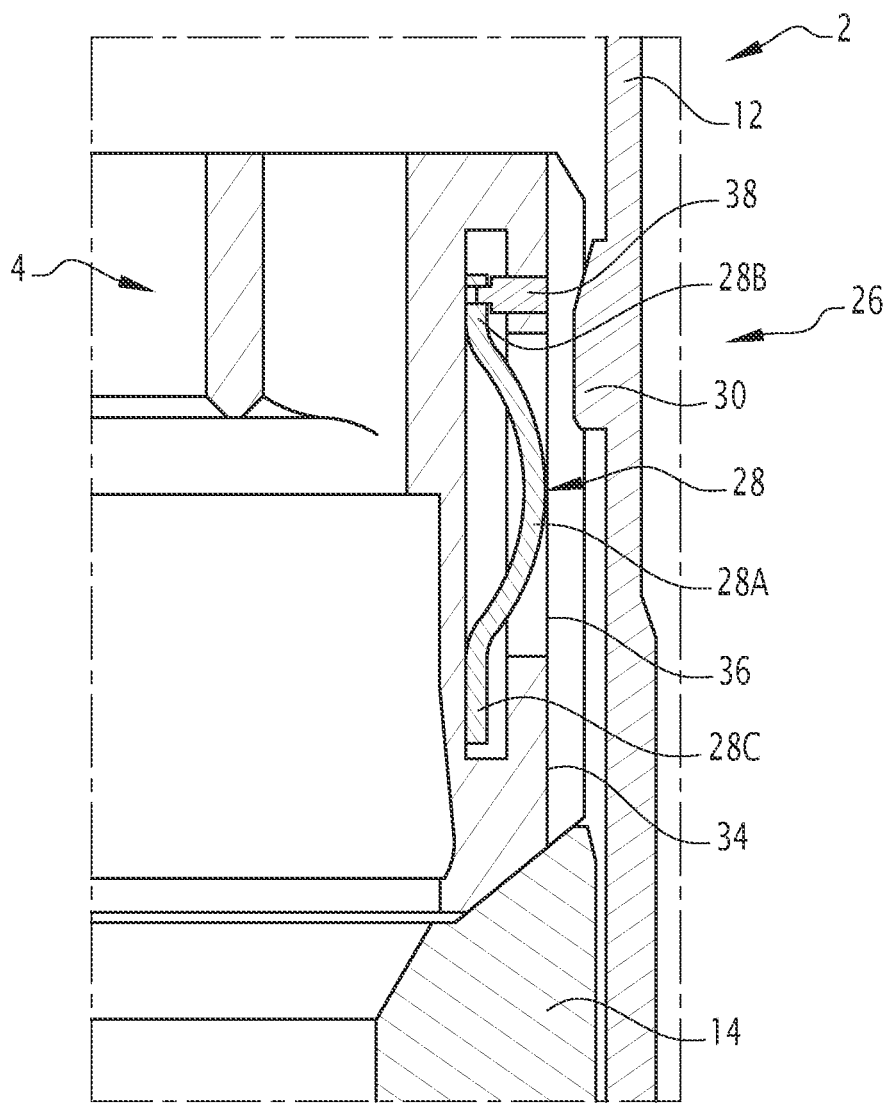
FIGS. 6 and 7 are schematic cross-sectional views illustrating an interaction device arranged between a lower tie plate and a fuel channel, respectively in deactivated configuration and activated configuration.
Figure 7:
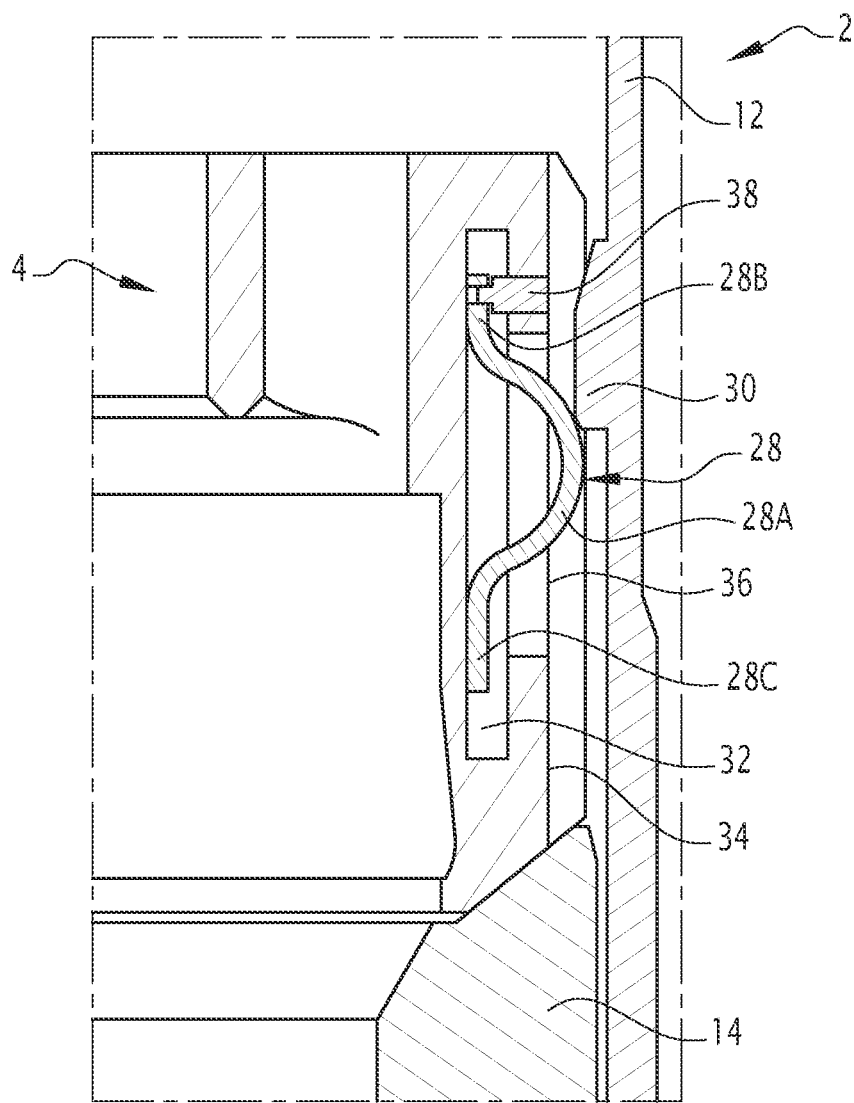

FIGS. 6 and 7 illustrate a particular example of an interaction device 26 configured for axially locking the lower tie plate 4 to the fuel channel 12 via form-fit.

The interaction device 26 comprises an interaction member 28 made of a shape memory alloy. The interaction member 28 is mounted inside a cavity 32 provided on a side face 34 of the lower tie plate 4, the cavity 32 emerging on the side face 34 via an opening 36.

The interaction member 28 is in the form of a blade having one intermediate portion 28A extending between two opposed end portions 28B, 28C. One end portion 28A is fixedly attached to the lower tie plate 4 inside the cavity 32, here via a screw 38, the other end portion 28B sliding inside the cavity 32, and the intermediate portion 28A is arched towards the opening 36.

In the inactive configuration (FIG. 6), the intermediate portion 28A is retracted inside the cavity 32, without protruding through the opening 36. In the active configuration (FIG. 7) the intermediate portion 28B protrudes outside the cavity 32 via the opening 36 and engages a locking feature 30 provided as a shoulder on the inner surface of the fuel channel 12 for axially locking the lower tie plate 4 relative to the fuel channel 12.

The end portion 28A fixedly attached to the lower tie plate 4 ensure appropriate axial locking of the lower tie plate 4 relative to the fuel channel 12. The sliding end portion 28B enables the change of shape of the interaction member 28.

Figure 8:
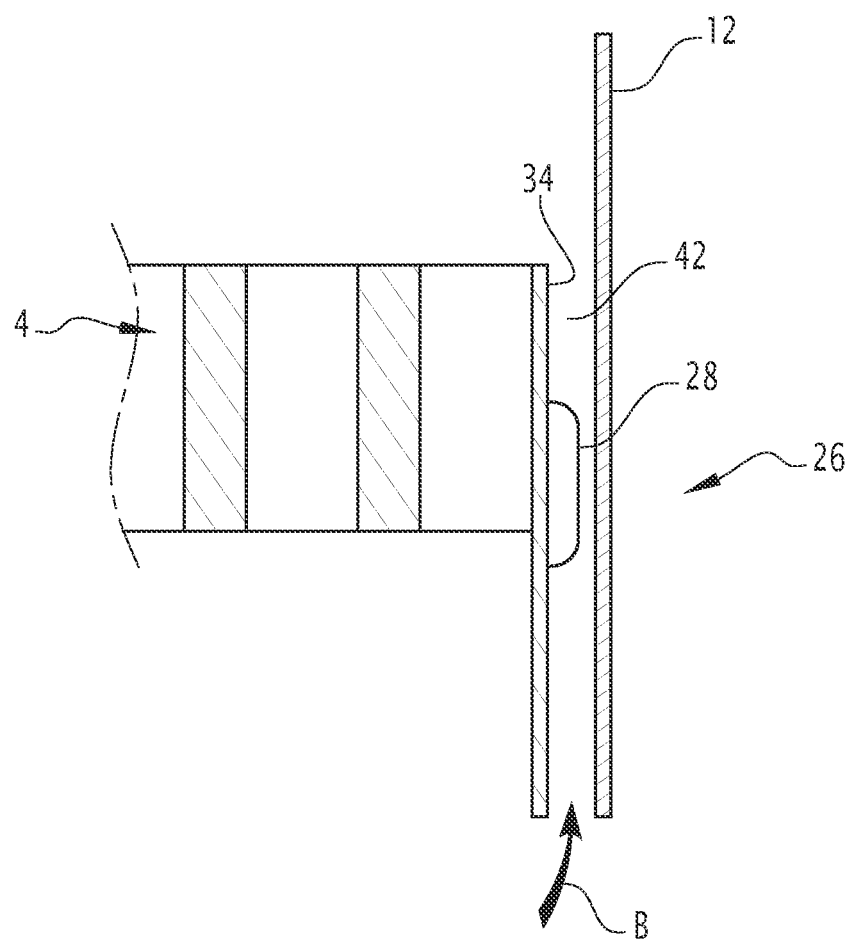
FIGS. 8 and 9 are schematic cross-sectional views illustrating an interaction device arranged between a lower tie plate and a fuel channel, respectively in deactivated configuration and activated configuration.
Figure 9:
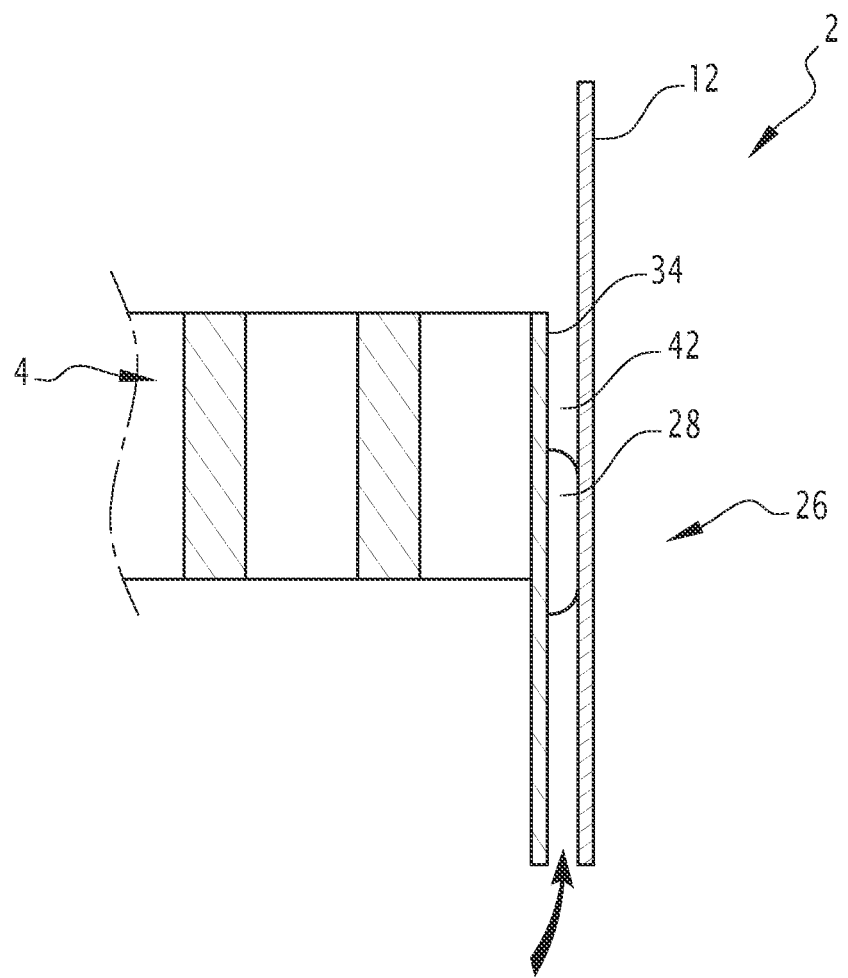

The interaction device of FIGS. 8 and 9 differs from that of FIGS. 2-7 in that the interaction device 26 is configured to engage with the fuel channel 12 for sealing a gap 42 between the periphery of the lower tie plate 4 and the inner surface of the fuel channel 12 in the active configuration (FIG. 9), the interaction device 26 being disengaged from the fuel channel 12 in the inactive configuration (FIG. 8)

Indeed, in operation, water flow upwardly into the transition piece 14 and through the lower tie plate 4 to then flow partly inside the fuel channel 12 in contact with the fuel rods 8 and partly inside the water channel 10. The lower tie plate 4 filter the water, e.g. for retaining debris that may damage the fuel rod 8 when entrained at high velocity in the water.

Water may by-pass the lower tie plate 4 with flowing in the gap 42 delimited between the periphery of the lower tie plate 4 and the inner surface of the fuel channel 12, as illustrated by arrow B on FIGS. 8 and 9. This may allow debris to enter the fuel channel 12.

The interaction device 26 sealing the gap 42 in the active configuration prevents water by-passing the lower tie plate 4. The interaction device 26 disengaged from the fuel channel 12 in the inactive configuration eases maintenance operations on the fuel assembly 2.

The considerations on the activation/deactivation of the interaction device 26 for axial locking presented above, in particular to respect to activation/deactivation as a function of temperature, apply to the activation/deactivation of the interaction device 26 for sealing the gap 42 whenever it is possible.

In particular, the interaction device 26 is advantageously activable/deactivable as a function of temperature.

The interaction device 26 is configured for example to activate itself above (resp. below) an activation temperature and to deactivate itself below (resp. above) a deactivation temperature, the activation temperature is identical to the deactivation temperature or being superior (resp. inferior) to the deactivation temperature.

In one example, the interaction device 26 is configured to activate at high temperature and to deactivate at low temperature.

The interaction device 26 is configured for example to activate itself above an activation temperature and to deactivate itself below a deactivation temperature.

The activation temperature and the deactivation temperature may be substantially identical (i.e. an activation/deactivation temperature) or, alternatively, the activation temperature may be higher than the deactivation temperature (e.g. is case of a hysteresis phenomenon).

Preferably, the interaction device 26 configured to be active and seal the gap 42 at high temperature and inactive at low temperature. Hence, the gap 42 is sealed at high temperature inside the reactor core during normal operation of the nuclear reactor and the interaction device is disengaged from the fuel channel during maintenance, e.g. in a cool fuel assembly storage pool.

In a preferred example, the activation temperature and the deactivation temperature are substantially equal and comprised between 80° C. and 120° C., e.g. around 100° C.

The interaction device 26 comprises for example at least one interaction member 28 that exhibits a first shape in the inactive configuration (FIG. 8) and a second shape in the active configuration (FIG. 9).

Each interaction member 28 is attached to the periphery of the lower tie plate 4 such that in the first shape the interaction member 28 is disengaged from the inner surface of the fuel channel 12 (FIG. 8) and in the second shape de interaction member 28 is on contact with the inner surface of the fuel channel 12 (FIG. 9) to seal the gap 42.

Each interaction member 28 is for example made in a shape memory alloy, such that the interaction device 26 is activated/deactivated as a function of temperature.

Preferably, the interaction member 28 is configured to exhibit the first shape below a deactivation temperature and to exhibit the second shape above an activation temperature. The activation temperature and the deactivation temperature are for example substantially equal.

The lower tie plate 4 exhibits for example a polygonal contour with sides, in particular a rectangular or square contour. Advantageously, the interaction device 26 comprises a respective interaction member 28 provided on each side of the contour of the lower tie plate 4, each interaction member 28 being elongate along the corresponding side of the contour of the lower tie plate 4.

FIGS. 2-7 illustrate a interaction device 26 configured for axial locking of the lower tie plate 4 relative to the fuel channel 12 and FIG. 8-9 illustrate a interaction device 26 configured for sealing a gap 42 between the lower tie plate 4 and the fuel channel 12.

In an example, an interaction device 26 is configured for both axial locking of the lower tie plate 4 relative to the fuel channel 12 and sealing a gap 42 between the lower tie plate 4 and the fuel channel 12.

Such an interaction device 26 activated/deactivated as a function of temperature comprises for example an interaction member 28 made of a shape memory alloy configured for locking of the lower tie plate 4 relative to the fuel channel 12 via form-fit and/or friction and sealing the gap 42 between the lower tie plate 4 and the fuel channel 12 when the interaction device 26 is active, in particular above an activation temperature, while being disengaged from the fuel channel 12 when the interaction device 26 is inactive, in particular below a deactivation temperature.

Figure 10:
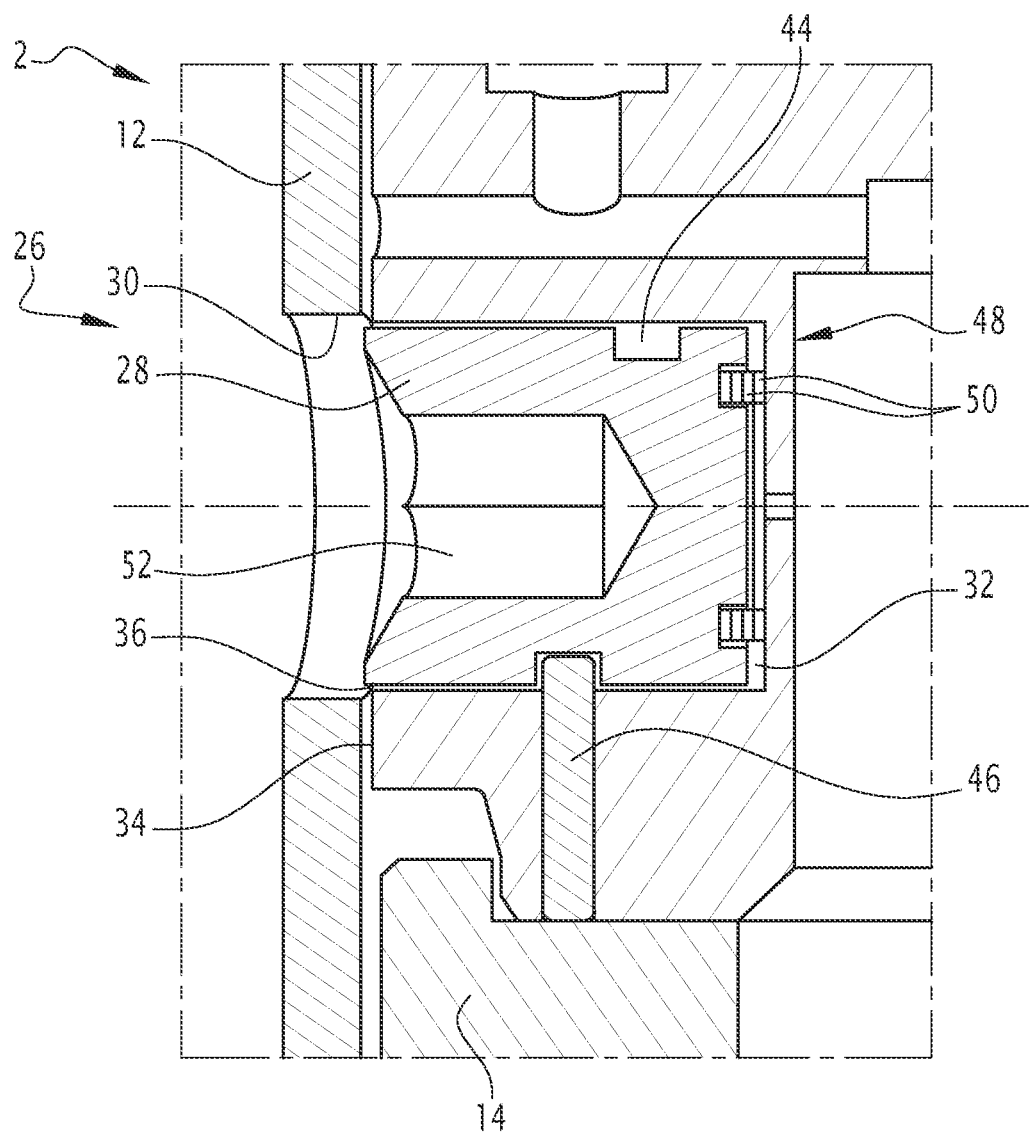
FIGS. 10 and 11 are schematic cross-sectional views illustrating an interaction device arranged between a lower tie plate and a fuel channel, respectively in deactivated configuration and activated configuration.
Figure 11:
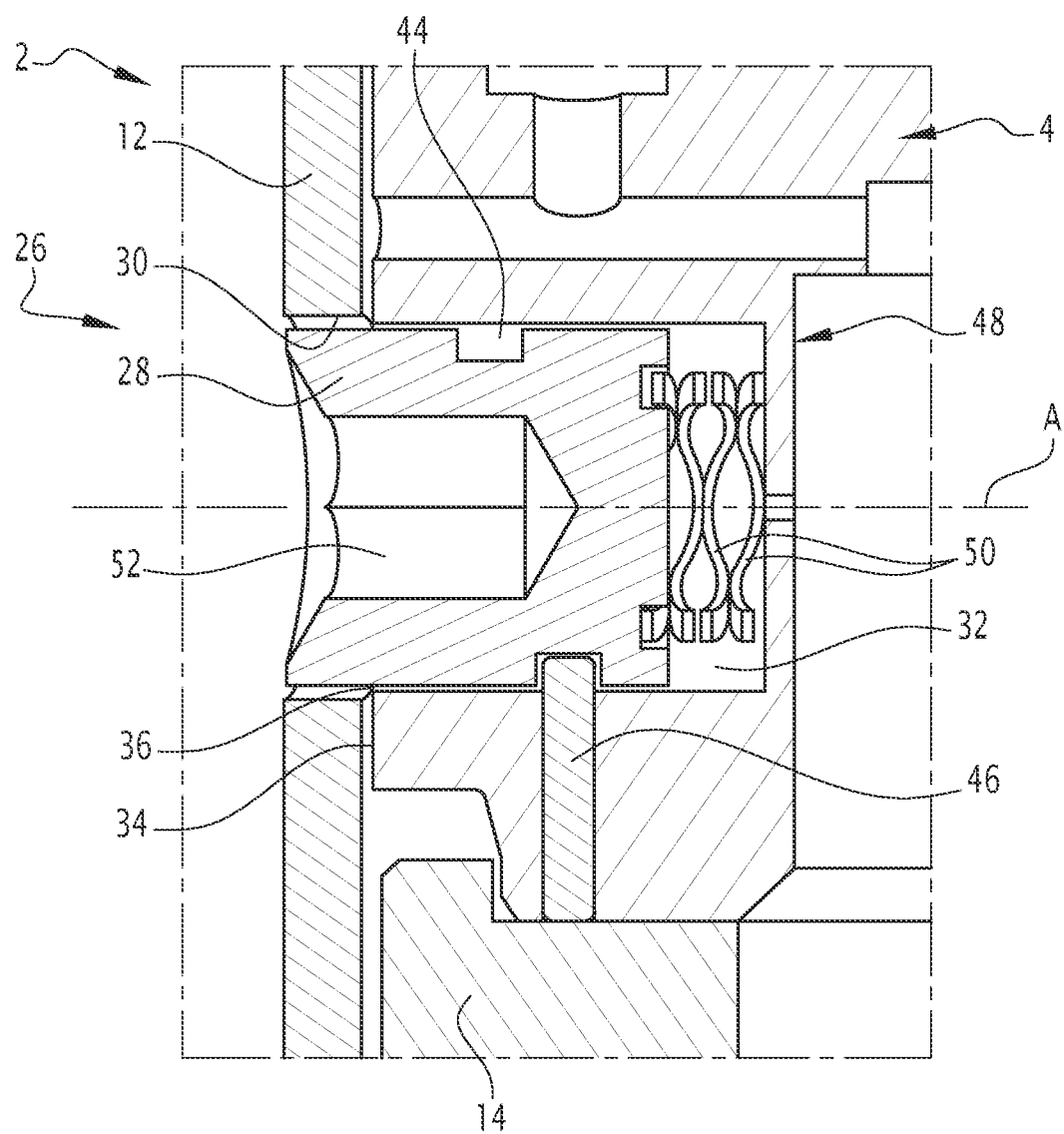

As illustrated on FIGS. 10 and 11, in one example, the interaction device 26 is configured for being selectively configurable between the inactive configuration (FIG. 10) and the active configuration (FIG. 11) by a position action of an operator, preferably when the lower tie plate 4 is received in the fuel channel 12 and from outside the fuel channel 12, e.g. using a tool.

As illustrated on FIGS. 10 and 11, the interaction device 26 comprises an interaction member 28 that is mounted onto the lower tie plate 4 with being movable between an inactive position (FIG. 10) and an active position (FIG. 11).

In the active position (FIG. 11), the interaction member 28 protrudes from the lower tie plate 4 and into an interaction feature 30 of the fuel channel 12 that is provided as a through hole. The interaction member in the active position axially lock the lower tie plate 4 relative to the fuel channel 12.

In the inactive position (FIG. 10) the interaction member 28 is retracted from the interaction feature 30. It does not oppose to an axial movement of the lower tie plate 4 relative to the fuel channel 12.

The interaction member 28 is operable between the inactive position and the active position through the interaction feature 30 provided as a hole.

The interaction member 28 is movable between the inactive position and the active position along a moving axis A.

The interaction member 28 is movable between the inactive position and the active position by rotation the interaction member 28 around the moving axis A, the rotation of the interaction member 28 around the moving axis A generating movement of the interaction member 28 along a moving axis A.

The interaction member 28 is for example received inside a cavity 32 of the lower tie plate 4, a helical slot 44 being provided on one of the interaction member 28 and the lower tie plate 4, and a retaining member 46 being provided on the other one of the interaction member 28 and the lower tie plate 4, the retaining member 46 being engaged into the slot 44.

In the example illustrated on FIGS. 10 and 11, the slot 44 is provided on the interaction member 28 and the retaining member 46 is provided in the lower tie plate 4. In another example, the configuration is the opposite.

The pitch of the slot 44 is chosen that that the retaining member 46 prevent an axial movement of the interaction member 28 unless the interaction member 28 is rotated about the moving axis A.

Optionally, the interaction device 26 comprises a spring 48 arranged for urging the interaction member 28 from the inactive position to the active position. The spring 48 is for example a compression spring 48 arranged between a bottom of the cavity 32 and the interaction member 28 to urge the interaction member 28 outside the cavity 32.

The spring 48 is for example formed at least one spring ring 50, in particular at least one spring ring 50 that is undulated circumferentially. The spring 48 comprises foe example a plurality of spring rings 50 stacked along a moving axis A.

The interaction member 28 is configured for cooperating with a tool for operating the interaction member 28 between the active position and that inactive position.

The interaction member 28 comprises for example a socket 52 for receiving a tool, in particular a tool such as a screwer, for operating the interaction member 28 between the active position and that inactive position. The socket 52 is has for example a hexagonal shape. In variants the socket 52 has a square shape, a multi-lobe shape (e.g. of the Torx type) or a cruciform shape (e.g. a Phillips type).

Alternatively or optionally, the interaction member 28 as an outer shape for cooperating with a tool, in particular a tool such as a spanner, for operating the interaction member 28 between the active position and that inactive position. The outer shape is for example a hexagonal shape or a square shape.

Upon assembling the fuel assembly 2, the interaction member 28 is initially retracted in the inactive position. Once the lower tie plate 4 has been inserted in the fuel channel 12, the interaction device 26 is operated through the interaction feature 30 provided as a hole to move the interaction member 28 in the active position, thus axially locking the lower tie plate 4 relative to the fuel channel 12. The fuel assembly 2 can then be used and in particular can be placed in the reactor core.

In operation, the lower tie plate 4 axially locked to the fuel channel 12 by the interaction device 26 does not lift upward relative to the fuel channel 12 under the effect of the flow of water through the lower tie plate 4.

In view of a maintenance operation, the fuel assembly 2 is lifted using the handle 18 and place in a storage pool.

The interaction device 26 is then operated by an operator to move the interaction member 28 in the inactive position such that the lower tie plate 4 can be lifted upward relative to the fuel channel 12 during extraction of the sub-assembly including the lower tie plate 4, the upper tie plate 6 and the fuel rods 8 from the fuel channel 12.

Figure 12:
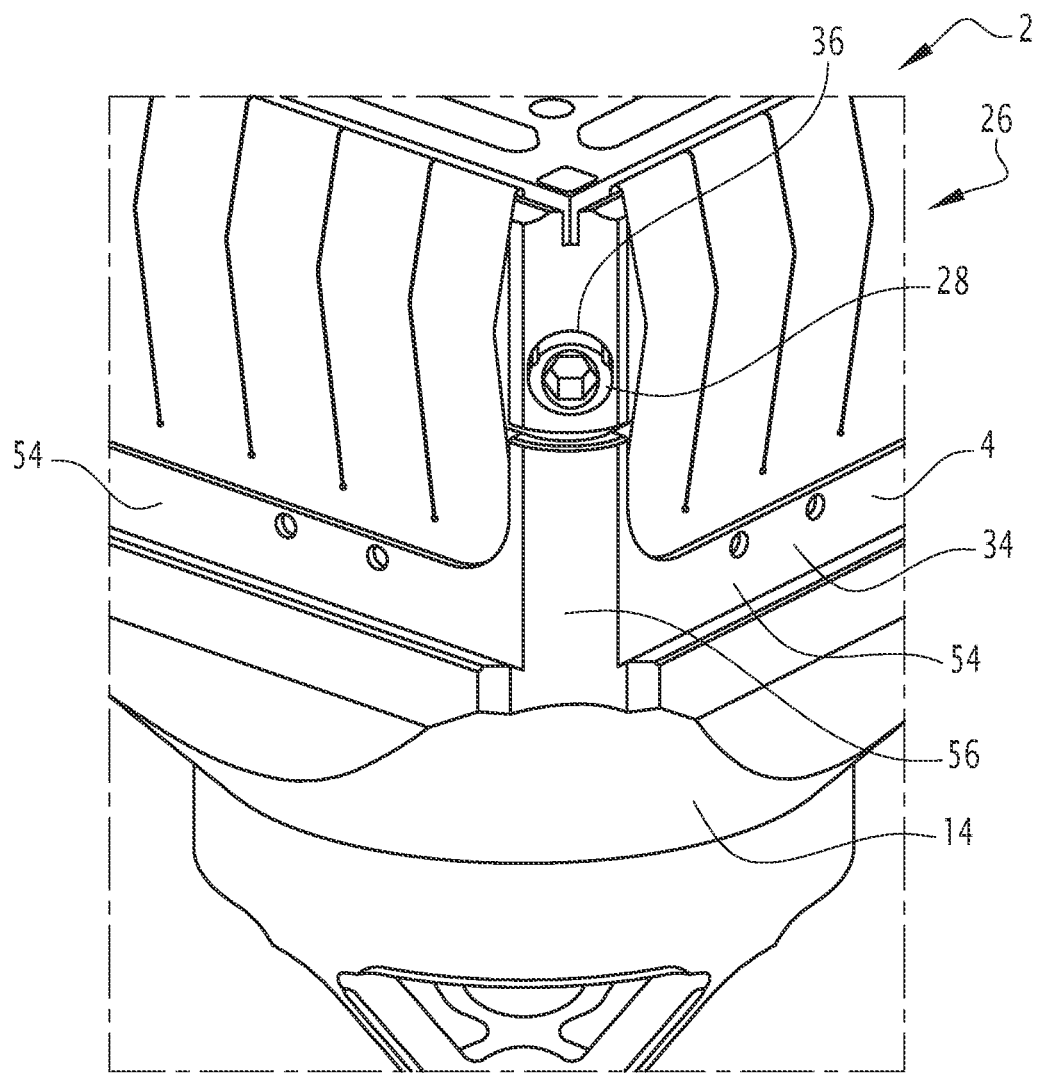
FIG. 12 is a partial perspective view illustrating a corner of the lower tie plate of FIGS. 10 and 11.

As shown on FIG. 12 which illustrates a partial perspective view of the lower tie plate 4 and the transition piece 14, the lower tie plate 4 may exhibit a rectangular or square shape with sides 54 connecting at corner 56. The two sides 54 of each pair of adjacent sides 54 connect at a respective corner 56.

In one example, at least one interaction device 26 is provided at a corner 56. The interaction member 28 is movable between the inactive position in which the interaction member 28 is retracted into the corner 56 and the active position in which the interaction member 28 protrudes from the corner 56.

Preferably, the lower tie plate 4 is provided with at least one interaction device 26 at each corner 56 of the lower tie plate 4.

The interaction member 28 of each interaction device 26 provided at a corner 56 is for example movable between the inactive position and the active position along a moving axis that is substantially diagonal relative to the rectangular of square shape of the lower tie plate 4.

Interaction devices 26 may be provided on sides 54 and/or corners 56 (i.e. on sides 54 only or on corners 56 only or both on sides 54 and corners 56).

Owing to the present disclosure, an interaction device 26 for an interaction between the lower tie plate 4 and the fuel channel 12 is easily activated/deactivated for selectively activating interaction during normal operation and deactivating interaction during maintenance.

The interaction is in particular an axial locking for avoiding the lower tie plate 4 to lift upwards relative to the fuel channel 12 under the effect of the flow of water, while allowing removal of the lower tie plate from the fuel channel 12, in particular underwater and/or a sealing for avoiding water to flow in a gap 42 between the periphery of the lower tie plate 4 and the inner surface of the fuel channel 12.

The activation/deactivation is advantageously automatic as a function of temperature, e.g. via the use of an interaction member 28 made of shape memory alloy or operated by a positive action of an operator, e.g. using a tool.

What is claimed is:

1. A fuel assembly for a boiling water reactor, the fuel assembly being elongated along a fuel assembly axis, the fuel assembly comprising:
   a lower tie plate;
   an upper tie plate axially spaced from the lower tie plate;
   a bundle of fuel rods extending axially between the lower tie plate and the upper tie plate;
   a tubular fuel channel extending from the lower tie plate to the upper tie plate and encasing the fuel rods; and
   an interaction device mounted on the lower tie plate and configured to interact with the fuel channel,
      wherein the interaction device is operable with a tool to switch between an inactive configuration and an active configuration;
      wherein the interaction device comprises an interaction member that is movably mounted on the lower tie plate between an inactive position in which the lower tie plate is liftable upward relative to the fuel channel and an active position in which the lower tie plate is locked to the fuel channel by the interaction member;
      wherein the interaction device comprises a return member configured for urging the interaction member from the inactive position to the active position;
      wherein the interaction device comprises a retaining mechanism configured for retaining the interaction member in the inactive position;

wherein the retaining mechanism comprises an helical slot provided on one of the interaction member and the lower tie plate, and a retaining member provided on the other one of the interaction member and the lower tie plate, the retaining member for engaging into the helical slot, the retaining member being in the helical slot in the active position.

2. The fuel assembly as in claim 1, wherein the interaction device in the active configuration axially connects the lower tie plate to the fuel channel, the fuel channel being axially movable relative to the lower tie plate when the interaction device is in the inactive configuration.

3. The fuel assembly as in claim 2 wherein the interaction device in the active configuration axially connects the lower tie plate to the fuel channel by engaging with an interaction feature of the fuel channel.

4. The fuel assembly as in claim 1, wherein the interaction device comprises a recess for receiving the tool for operating the interaction device.

5. The fuel assembly as in claim 1, wherein the interaction member protrudes from the lower tie plate and into an interaction feature of the fuel channel that is a through hole.

6. The fuel assembly as in claim 5, wherein in the inactive position, the interaction member is retracted from the interaction feature.

7. The fuel assembly as in claim 1, wherein the slot is provided on the interaction member and the retaining member is provided in the lower tie plate.

8. The fuel assembly as in claim 1, wherein the interaction member is received inside a cavity of the lower tie plate.

9. The fuel assembly as in claim 1, wherein the return member comprises a compression spring arranged between a side surface of a cavity of the lower tie plate and the interaction member to urge the interaction member outside the cavity, the compression spring comprising rings that are undulated circumferentially, the rings being stacked along a moving axis.

10. The fuel assembly as in claim 1, wherein the interaction member comprises a socket for receiving the tool for operating the interaction member between the active position and the inactive position.

11. The fuel assembly as in claim 10, wherein the tool is a screwdriver.

12. The fuel assembly as in claim 1, wherein the interaction member has an outer shape for cooperating with the tool for operating the interaction member between the active position and that inactive position.

13. The fuel assembly as in claim 12, wherein the tool is a spanner.

14. The fuel assembly as in claim 1, wherein the lower tie plate exhibits a rectangular or square shape with sides connecting at corners,
the interaction device being provided on or at one of the sides and/or one of the corners.

15. The fuel assembly as in claim 1, wherein the retaining member is in the helical slot in the inactive position.

16. The fuel assembly as in claim 1, wherein the return member is configured to force the interaction member along a moving axis of the interaction member between the active and inactive positions as a result of a change of a position of the retaining member in the slot.

17. The fuel assembly as in claim 1, wherein the slot has a pitch configured to cause the retaining member to prevent an axial movement of the interaction member unless the interaction member is rotated about a moving axis of the interaction member, the interaction member configured for moving along the moving axis between the active and inactive positions.

18. The fuel assembly as in claim 17, wherein the return member comprises a spring fixed to the lower tie plate in a cavity of the lower tie plate, the spring urging the interaction member during a change of a position of the retaining member in the slot.

19. The fuel assembly as in claim 18, wherein the return member is configured to urge the interaction member along the moving axis to outside the cavity upon a rotation of the interaction member about the moving axis.

20. The fuel assembly as in claim 19, wherein the interaction device is configured to cause the change of the position of the retaining member in the slot upon the rotation of the interaction member about the moving axis.

21. The fuel assembly as claimed in claim 1 further comprising a transition piece axially fixedly attached to a lower end of the fuel channel and the lower tie plate is configured to be lifted relative to the transition piece.

\* \* \* \* \*